UNITED STATES PATENT OFFICE.

HARRIETTE A. GRAY, OF BROOKLYN, NEW YORK.

COMPOSITION TO BE ADDED TO STARCH TO IMPROVE ITS QUALITY.

SPECIFICATION forming part of Letters Patent No. 337,490, dated March 9, 1886.

Application filed October 14, 1885. Serial No. 179,870. (No specimens.)

*To all whom it may concern:*

Be it known that I, HARRIETTE A. GRAY, of the city of Brooklyn, in the county of Kings and State of New York, have invented a new and useful Composition to be Added to Starch for Improving its Qualities for Laundry Uses, of which the following is a specification.

This composition consists in a mixture of borate of soda and chloride of sodium, in the proportions, by weight, of about four parts borate of soda and one part chloride of sodium.

When this composition is added to starch for laundry purposes in the proportions, by weight, of one part of the composition to four parts of starch, the results are great economy of starch, time, and labor.

In using my composition the starch is first thoroughly mixed with cold water, in the proportions of about one table-spoonful of starch to one pint of water, and for this quantity of starch about a teaspoonful of the composition is dissolved in half a pint of cold water, and this solution is added to and mixed with the starch. This mixture is strong enough for shirts, cuffs, collars, and other articles which require to be very stiff; but for other linen and calicoes one quart of cold water may be added to the mixture. The articles are starched by being dipped in the above mixture and wrung out to a proper degree of dryness, and they are then ready for immediate ironing.

Starch having my composition added to it has many advantages over simple starch. In the first place, one pound of starch with the addition of the composition in the proportions specified will properly starch as many clothes as three pounds of simple starch, and give greater and more permanent stiffness, and hence greater economy results. Then, as the boiling is dispensed with, there is further saving of time and labor. Again, clothes starched with starch with this addition are ready for ironing immediately after having been starched and wrung, instead of requiring to be dried and remoistened by sprinkling, as when simple starch is used, and hence a further saving of time and labor; and a further advantage is, that the clothes do not stick to the iron in ironing.

The proportions of borate of soda and chloride of sodium in my composition may be varied to some extent without essentially changing the character and effects of the composition; but the proportions which I have hereinabove given are those which I have determined by experiment to be the best.

What I claim as my invention, and desire to secure by Letters Patent, is—

The within-described composition for improving the qualities of starch, consisting of borate of soda and chloride of sodium, in about the proportions herein set forth.

HARRIETTE A. GRAY.

Witnesses:
HENRY T. BROWN,
HELEN E. GRAY.